United States Patent [19]

Diepenbrock, Jr. et al.

[11] 4,257,998

[45] Mar. 24, 1981

[54] METHOD OF MAKING A CELLULAR CORE WITH INTERNAL SEPTUM

[75] Inventors: James L. Diepenbrock, Jr., Wichita; M. Dean Nelsen, Goddard; Marlyn F. Harp, Winfield, all of Kans.

[73] Assignee: The Boenig Company, Seattle, Wash.

[21] Appl. No.: 941,148

[22] Filed: Sep. 11, 1978

Related U.S. Application Data

[62] Division of Ser. No. 901,337, May 1, 1978.

[51] Int. Cl.³ .......................................... B29C 17/08
[52] U.S. Cl. .................................. 264/156; 181/222; 181/286; 181/293; 181/296; 264/138; 264/221; 264/271; 264/275; 264/317; 425/DIG. 12
[58] Field of Search ............... 264/154, 138, 221, 322, 264/313, 317, 298, 299, 278, 267, 347, 156, 271, 225; 428/116; 425/DIG. 12; 181/222, 286, 292, 293, 296

[56] References Cited

U.S. PATENT DOCUMENTS

| | | | |
|---|---|---|---|
| 2,870,857 | 1/1959 | Goldstein | 428/116 |
| 3,064,345 | 11/1962 | Herman et al. | 264/278 |
| 3,555,131 | 1/1971 | Weismann | 264/46.7 |
| 3,670,843 | 6/1972 | Kelly | 428/116 |
| 3,734,234 | 5/1973 | Wirt | 428/116 |
| 3,748,213 | 7/1973 | Kitching et al. | 428/116 |
| 3,821,999 | 7/1974 | Guess et al. | 181/296 |
| 3,910,374 | 10/1975 | Holehouse | 181/292 |
| 3,913,702 | 10/1975 | Wirt et al. | 181/286 |
| 3,948,346 | 4/1976 | Schindler | 181/286 |
| 4,084,367 | 4/1978 | Saylor et al. | 181/292 X |
| 4,088,723 | 5/1978 | Norton | 264/221 |

*Primary Examiner*—Philip Anderson
*Attorney, Agent, or Firm*—Edwin H. Crabtree

[57] ABSTRACT

A method of making a panel for installation in the high velocity air flow region of an engine nacelle and other applications requiring sound absorbing material and increased air frame strength. The panel utilizes a single layer of either a metallic or nonmetallic cellular core with a solid or perforated septum disposed internally therein. The septum may have a planar or nonplanar configuration within the individual cells of the core thereby providing means for reducing the noise level of various sound frequencies created by a jet engine or any other sound producing devices for that matter. The planar or nonplanar septum provides structural stabilization and/or vibration dampening to a bonded sandwich assembly. The panel may also be used in strengthening air frame construction and other applications besides sound attenuating panels.

5 Claims, 14 Drawing Figures

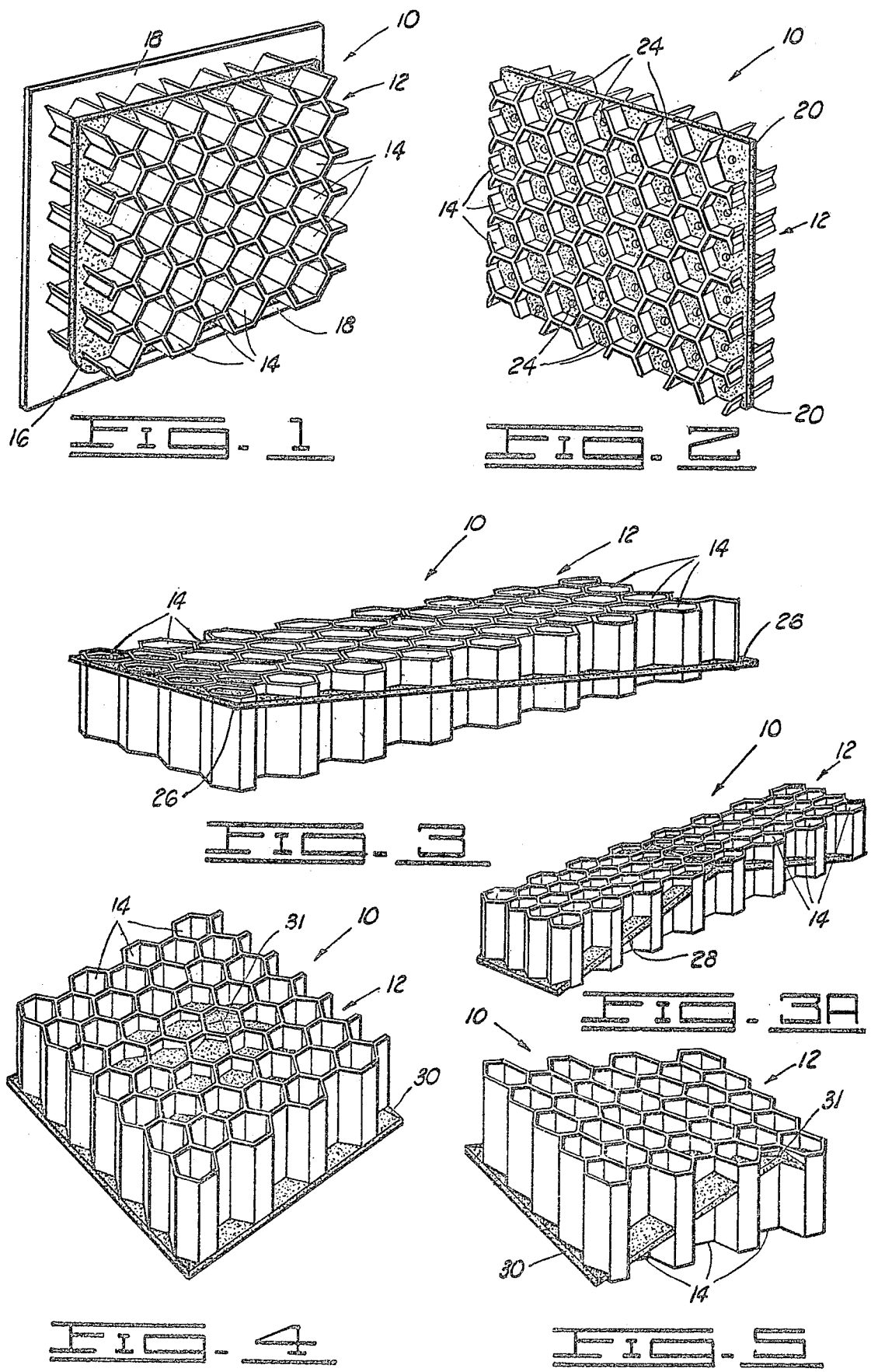

METHOD OF MAKING A CELLULAR CORE WITH INTERNAL SEPTUM

CROSS-REFERENCE TO RELATED APPLICATION

This application for patent is a divisional application of our application entitled HONEYCOMB CORE WITH INTERNAL SEPTUM, AND METHOD OF MAKING SAME, Ser. No. 901,337, filed May 1, 1978.

BACKGROUND OF THE INVENTION

This invention relates generally to a method of making an improved cellular core panel and more particularly, but not by way of limitation, to a method of making a cellular honeycomb sandwich construction for installation in an engine nacelle or other applications requiring sound absorption and increased airframe strength.

Heretofore, advanced technology sound attenuating panels in an engine nacelle have been constructed primarily using a double layer of honeycomb core with a septum bonded between the two layers. Facing material is then bonded on both sides of the double layer forming a core sandwich. This type of construction requires four bond lines which degrades the strength of the sandwich structure. Also, it is impossible to align the individual cells of the adjacent layers. Further, heat transfer is less efficient and varies due to the septum bond lines and the misalignment of the individual cells.

In the fabrication of a core sandwich where a septum is provided having various depths within the individual cells, complex machining and assembly techniques are required. This is not only expensive, but time consuming.

A prior art acoustical structure is used wherein a single layer of honeycomb core is provided with an intermittent zone in the core which is crushed to form a sound barrier therein. Also, there is a single layer honeycomb core structure wherein the individual cells are filled with foam plugs to a single cell depth. This structure does not provide for varying depth cells. An additional sound absorption honeycomb core structure provides a cellular array cut obliquely so that the effective lengths of the cells vary along the plane of the cut. None of the prior art core structures and methods of making these core structures provide the advantages of the method of making the cellular core with internal septum described herein.

SUMMARY OF THE INVENTION

The panel produced from the method of the invention has a single layer of cellular core with an internal septum which provides more predictable acoustic properties as compared to a double layer core sandwich.

The panel provides a direct heat transfer path in the sound attenuating panel and misalignment of core cells is eliminated.

The panel provides the elimination of, but not limited to the communication of gasses or fluids between adjacent cells of the cellular core structure.

The single layer core construction requires only two bond lines in the attaching of the facing material, therefore the panel has a better bond reliability as compared to the double layer construction. Also, the single layer construction is structurally more sound.

The method of forming a single layer core with septum provides the versatility of a septum with varied cell depth. The septum may be either planar or nonplanar in the core. This combination of structure allows for sound attenuation of the different sound frequencies from a jet engine and provides increased structural strength of the cellular core.

The method of making the panel allows insertion of a planar or nonplanar septum for the purpose of structural stabilization of the cellular core and/or providing vibration dampening characteristics to a bonded sandwich assembly. The increased structural stabilization of the cellular core with internal septum provides a panel which can also be used for strengthening air frame construction.

The panel is easily constructed and eliminates the high cost of complex machining and assembly techniques required to form a septum having different geometric configurations in a double layer core sandwich.

The panel includes a single layer of cellular core. A septum is formed internally in the core and divides the layer of the core along its length. The panel requires at least one facing material attached to the surface of the core. The cellular core and facing material may be made of metallic or nonmetallic material. The facing material and septum may be solid or perforated. The septum may be made of metallic or nonmetallic materials or a combination thereof, having suitable structural, acoustic, and environmental resistance properties.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 illustrates a single layer of hexagonal cellular core having a solid planar septum disposed internally therein.

FIG. 2 is similar to FIG. 1 and illustrates a perforated septum.

FIG. 3 illustrates a tapered septum.

FIG. 3A illustrates a fluted septum.

FIG. 4 illustrates a pyramidal septum.

FIG. 5 illustrates a cross section of the pyramidal septum.

DETAILED DESCRIPTION OF THE DRAWINGS

Figure 6A:
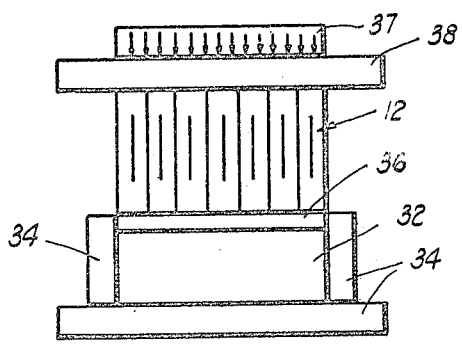
FIGS. 6A and 6B illustrate a method of making a cellular core with an internal septum.

In FIG. 1, the sound attenuating panel for installation in an engine nacelle, or other applications requiring sound absorbing material and increased air frame strength, is designated by general reference numeral 10. The panel 10 includes a single layer of cellular core 12 having individual cells 14. A septum 16 is disposed internally in the core 12 and divides the individual cells 14. Attached to the surface of the core 12 is a sheet of facing material 18. While only one facing material 18 is shown, there may be an additional facing material on the opposite surface of the core 12 forming a sandwich type construction. The facing material 18 may be permeable or nonpermeable to fluid flow therein depending on the type of material used or its intended use.

In this illustration, the septum 16 has a planar geometric configuration parallel to the facing material 18 and divides the core 12 in any equal or nonequal proportion of depth. A plurality of septums 16 may be inserted in the core 12. The core 12 while shown in a hexagonal cellular shape may also have various angular configurations which are suitable for a specific application. Also, the core 12 may have a flexible core design or other than hexagonal shapes which are well known in the use of cellular core structures. The core 12 may be made of a metallic or nonmetallic material. The septum may be made of metallic or nonmetallic materials such as resins, plastics, ceramics, rubber products and any other suitable material which may be adapted for practicing the method of making the panel 10 as described herein.

In FIG. 2, the panel 10 is similar to that shown in FIG. 1 except a septum 20 is shown having a plurality of perforations 24 therein. The perforations 24 provide additional acoustical properties for attenuating sound frequencies and are positioned in each individual cell 14 of the core 12 and may be of any predetermined shape, size, or distribution. Again, a plurality of septums 20 with perforations 24 may be inserted within each individual cell 14 of the core 12.

In FIG. 3, the panel 10 is illustrated having a tapered septum 26. The septum 26 is a permeable or nonpermeable structure and divides the individual cells 14 into various depths. This embodiment provides the panel 10 with a structure for attenuating different wave frequencies of sound and/or for the purpose of structurally stabilizing the core and/or providing vibrational dampening of the structure.

FIG. 3A illustrates the panel 10 with a fluted septum 28 wherein the septum 28 is nonplanar and includes two intersecting planes disposed in the cell 14. Again, this embodiment is for attenuating different wave frequencies of sound and/or for the purpose of structurally stabilizing the core and/or providing vibrational dampening of the structures.

In FIG. 4, another embodiment of the panel 10 is illustrated wherein a nonplanar pyramidal shaped septum 30 is shown having a pinnacle 31 of the septum 30 disposed at the top of and in the center of the core 12 with the sides of the septum 30 tapering downwardly toward the bottom of the core 12. This type of geometric configuration would be used for attenuating a variety of different wave frequencies of sound and/or for the purpose of structurally stabilizing the core and/or providing vibrational dampening of the structure. FIG. 5 is a cross section of the pyramidal septum 30 and core 12 shown in FIG. 4. In this view, the various depths of the individual cells 14 can be seen with the septum 30 dividing each individual cell 14.

Figure 6B:
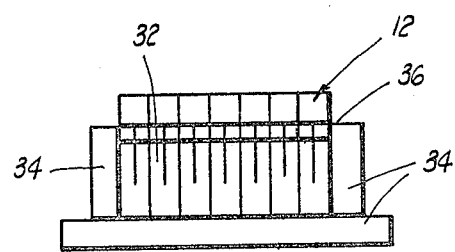
Figure 6C:
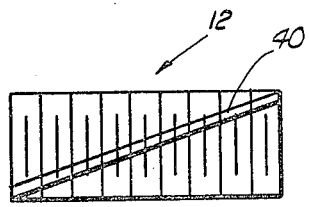
FIGS. 6C through 6E illustrate alternate configurations of the internal septum.
Figure 6D:
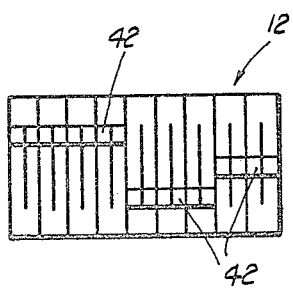
Figure 6E:
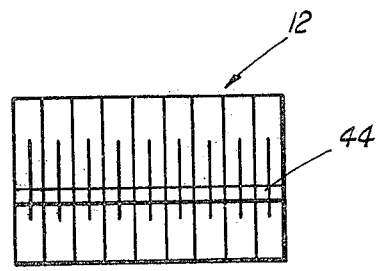

In FIGS. 6A and 6B, a specific example of the method of making the panel 10 is illustrated. Broadly the method of making the panel 10 is accomplished by placing a mandrel within a frame and warming the mandrel to a temperature where the mandrel can be easily cut by the core 12. A suitable septum material is then spread or positioned on top of the mandrel. The core is then positioned above the septum material and mandrel and then pressed through the septum material into the core until the septum material is at a desired depth internally in the core. The septum material is then heat cured until it is self supporting in the cells of the core and then the mandrel material is removed. In FIGS. 6C through 6E, various alternate embodiments of planar and nonplanar septa are shown.

In FIG. 6A, a destructible mold mandrel 32 made of a smooth flat sheet of a suitable material such as wax is positioned on a base 34. The mold 32 is heated as required to a temperature so that it can be easily cut by the core 12. The thickness of the mold 32 is determined by the desired location of the septum in the core 12. In this example, a septum 36 is in the form of a liquid resin material which is spread over the top of the mold 32 in a uniform layer and at a desired thickness. While a liquid resin septum 36 is discussed, a resin paste, resin film, rubber sheet, or any other metallic or nonmetallic septum materials have worked equally well in the described method.

Again, the core material may be either metallic or nonmetallic with the cell configuration being hexagonal or any other geometric configuration which is acceptable. The desired thickness of the core 12 is chosen and the core 12 is placed over the mandrel 32 and the liquid resin septum 36. The core 12 is then pressed through the septum 36 and into the mandrel 32 by the use of a uniform force 37 shown as a plurality of arrows, applied to the top of a platen 38 positioned on the top of the core 12.

In FIG. 6B, the core 12 has been pressed through the resin septum 36 and the mold 32 until the septum 36 is at the desired position internally in said core and/or the core 12 has bottomed on the base 34. The liquid resin is now cured by heating according to the manufacturers instructions. As the resin is cured, or at a temperature above the curing temperature of the resin, the wax-like material of the mold 32 subsequently melts thereby removing it from the internal cells of the core 12. The cured resin bonds itself to the sides of the individual cells of the core 12 thereby forming the internal septum 36. In the use of other types of septum materials such as a rubber sheet, a liquid resin is coated on the surface of core 12 prior to pressing the core 12 through the septum material and manrel. The resin coating helps bond the rubber sheet to the sides of the cells.

FIG. 6C illustrates a tapered septum 40 similar to the septum 26 shown in FIG. 3. The septum 40 is formed internally in the core 12 using the same method as described in FIGS. 6A and 6B, but with the top of the mold 32 having a tilted surface corresponding with the angle of the septum 40. Also, the mold 32 and the formed septum 40 need not be planar in shape as shown.

FIG. 6D shows another embodiment wherein a septum 42 is stair-stepped internally within the individual cells of the core 12. Again, the septum 42 is formed as described above by using a wax-like mandrel 32 having a similar non-planar geometric configuration.

FIG. 6E illustrates a planar septum 44, but positioned at a different depth in the individual cells of the core 12 as compared to the septum 36 shown in FIG. 6B.

While FIGS. 6A through 6E illustrate solid septa, the septa may also be perforated and in a pattern so that the septum in each cell has at least one perforation or any combination thereof.

Figure 7:
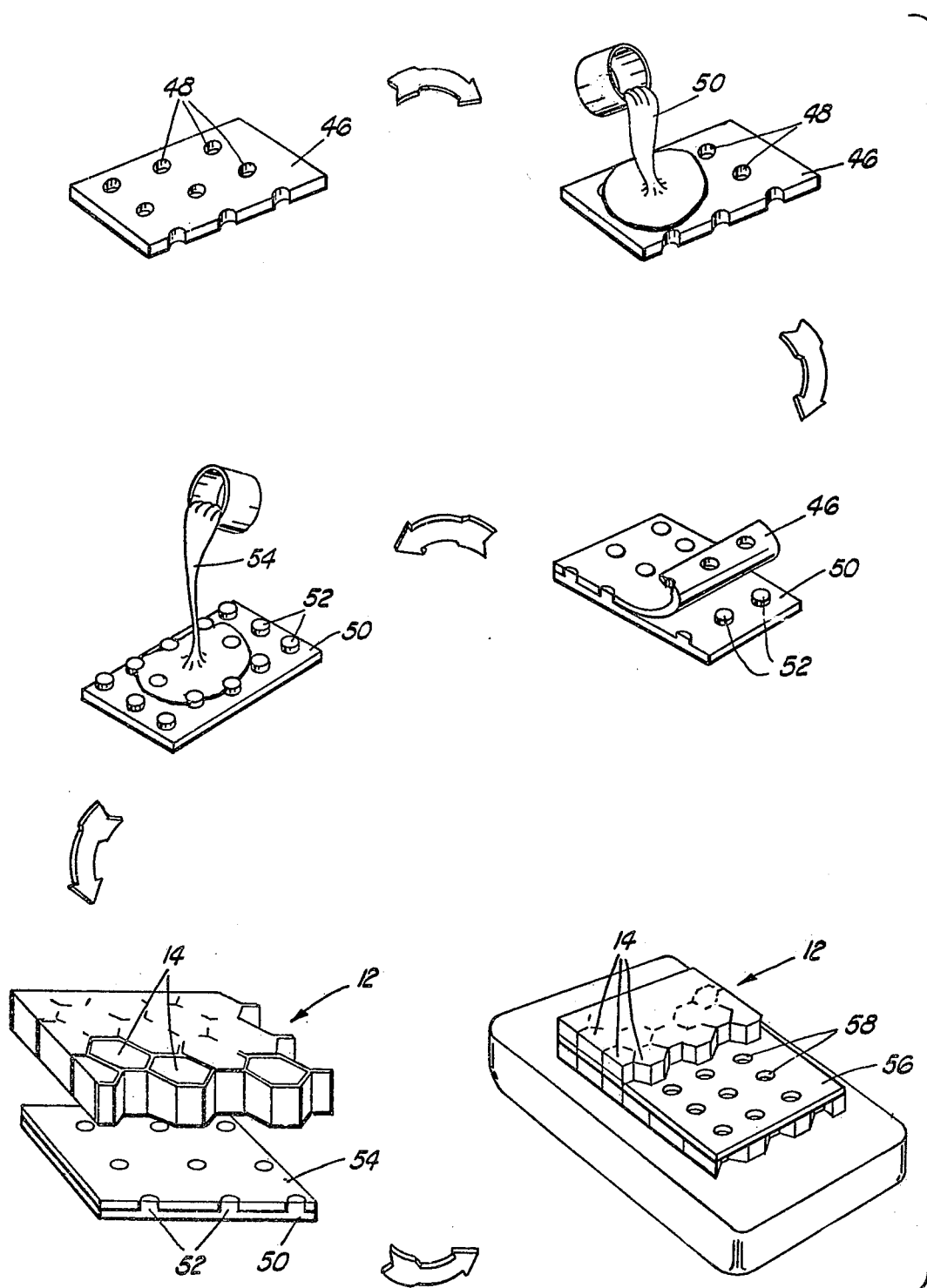
FIG. 7 illustrates a method of making a cellular core with a perforated septum.

In FIG. 7, a method of forming a perforated pattern in the septum is illustrated. A rubber or rubber-like perforated female mold 46 having the desired perforation pattern is selected wherein perforations 48 will correspond to the desired perforation pattern 58 in the septum 56. A liquid wax-like material 50 is poured on top of the rubber mold 46. The wax-like material 50 is allowed to harden and at the time, the rubber or rubber-like mold 46 is peeled therefrom exposing upwardly extending studs 52. The sheet of hardened wax or wax-like material 50 with studs 52 provide a destructible mold similar to the mold 32 discussed under FIGS. 6A and 6B. A liquid resin 54 is now poured on top of the wax 50 to a desired thickness keeping in mind the thickness should not exceed the height of the molded studs 52. A single layer of cellular core 12 is now positioned over the resin 54 and wax-like material 50. Using a uniform force, the core 12 is pressed through the layer of resin 54 and wax-like material 50 until the resin 54 is at a desired depth internally in the cells of the core 12 as described in FIGS. 6. The resin 54 is now heat cured and the wax-like material 50 is melted and discharged from the core 12 thereby providing an internal septum 56 with perforations 58 therein.

Figure 8:
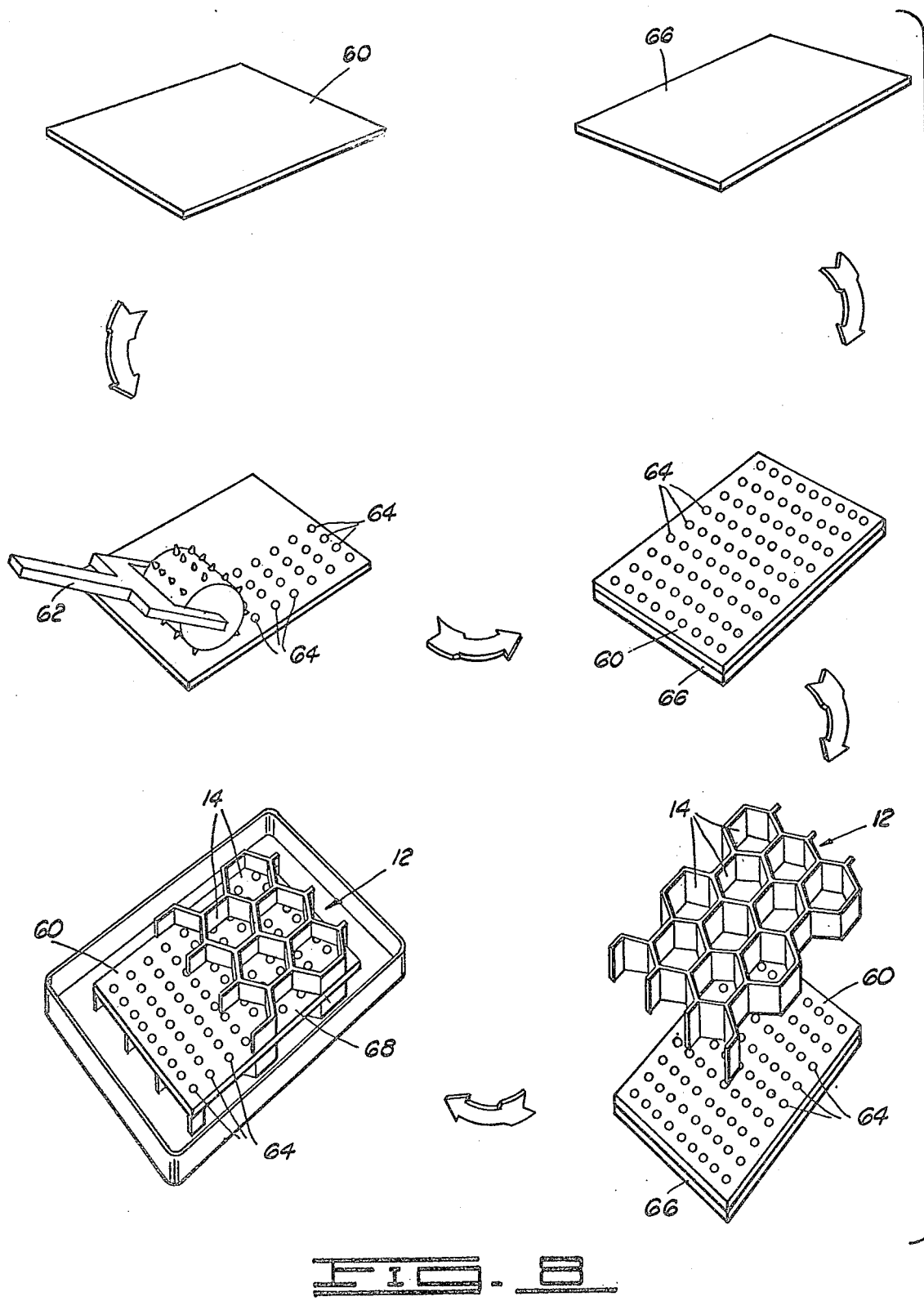
FIG. 8 illustrates an alternate method of making a cellular core with a perforated septum.

FIG. 8 illustrates an alternate method of forming a perforated pattern in a septum. In FIG. 8, a film of resin 60 is provided which is soft enough so that it may be easily penetrated therethrough by the cellular core 12. A perforation tool 62 is used for forming a pattern 64 on the film of resin 60. While the tool 62 is shown, it can be appreciated that any type of device for forming a pattern therein may be used equally well. The resin 60 with the perforation pattern 64 thereon is then placed on top of a sheet of wax-like material 66. The sheet of wax 66 will again act as a mandrel as discussed under FIGS. 6A and 6B. The cellular core 12 is now positioned above the film of resin 60 and sheet of wax 66 and forced therethrough until the desired depth of the resin 60 is positioned therein. The resin 60 is now heat cured and subsequently the sheet of wax 66 is melted and discharged from the core. When hardened, the resin 60 provides the core 12 with an internal perforated septum 68.

The method of FIG. 8 for inserting the septum 68 within the core 12 may be applied with any pre-perforated resin film, rubber, or rubber-like film which the core 12 can be used to "cookie-cut" the septum material 68 during the insertion of the core 12 into the septum material 68.

Figure 9:
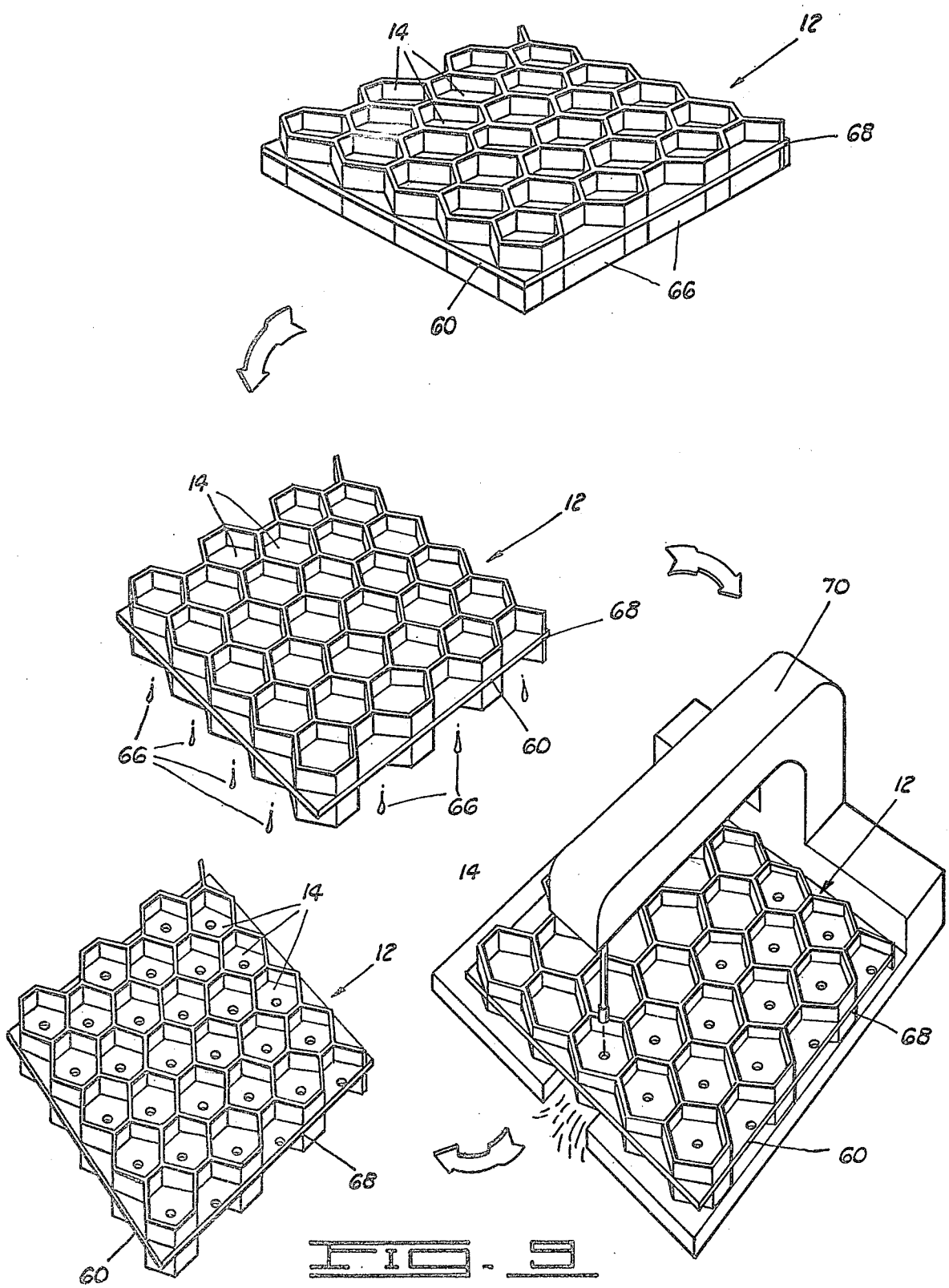
FIG. 9 illustrates a second alternate method of making a cellular core with a perforated septum.

FIG. 9 illustrates a second alternate method of forming a perforated pattern in the septum 68. In FIG. 9, the septum 68 has been inserted within the core 12 similar to the method shown in FIG. 8 except that the film of resin 60 was not perforated prior to insertion. After the resin 60 is cured, a laser 70 or any other energetic beaming device is used for forming a pattern of perforations in the septum 68. This method may be applied with any material suitable for use as a septum and that can be laser drilled or drilled with the selected beaming device. The drilled perforation pattern may be of a preselected pattern and perforation geometry within the capability of the laser or other beaming devices.

It should be noted that prior to forming a perforation pattern as discussed under FIGS. 7, 8 and 9, machine tools were used to perforate the septum. In using a metal septum, the hole thickness to diameter could not be greater than a ratio of 1 to 1. By forming the perforations as described above, the hole thickness to diameter is flexible to at least a ratio of 7 to 1 thereby providing a greater acoustic versatility in the construction of the panel 10.

Changes may be made in the construction and arrangement of the parts or elements of the embodiment as disclosed herein without departing from the spirit or scope of the invention as defined in the following claims.

We claim:

1. A method of making a cellular core panel with internal septum for installation in the high velocity air flow region of an engine nacelle, and other applications requiring sound absorption and increased air frame strength, the steps consisting of:
   placing a destructible mold on a base,
   said mold having upstanding studs in the top portion of the mold in a desired perforation pattern;
   spreading a septum material on top of the mold to a desired septum thickness, the upstanding studs penetrating the layer of the septum material and extending therethrough;
   positioning a cellular core above the septum material and pressing the core through the septum material and into the material of the destructible mold until the septum material is positioned at a precise position internally in the core; and
   stabilizing the septum material until the septum material is self-supporting within each cell of the core and subsequently removing the mold thereby providing a permanent internal septum with a planar geometric configuration.

2. A method of making a cellular core panel with internal septum for installation in the high velocity air flow region of an engine nacelle, and other applications requiring sound absorption and increased air frame strength, the steps consisting of:
   placing a destructible mold on a base;
   perforating a film of septum material in a desired perforation pattern;
   positioning the perforated film of septum material on top of the mold, the film of the septum material having a desired thickness;
   positioning a cellular core above the film of septum material and pressing the core through the septum material and into the material of the destructible mold until the septum material is at a precise position internally in the core; and
   stabilizing the septum material until the septum material is self-supporting within each cell of the core and subsequently removing the mold thereby providing a permanent internal septum with a planar geometric configuration.

3. A method of making a cellular core panel with internal septum for installation in the high velocity air flow region of an engine nacelle, and other applications requiring sound absorption and increased air frame strength, the steps consisting of:
   placing a destructible mold on a base;
   positioning a film of septum material on top of the mold, the film of the septum having a desired thickness;
   positioning a cellular core above the film of the septum material and pressing the core through the septum material and into the material of the destructible mold until the septum material is at a precise position internally in the core;
   stabilizing the septum material until the septum material is self-supporting within each cell of the core and subsequently removing the mold thereby providing a permanent internal septum with a planar geometric configuration; and
   perforating the septum material within each cell of the core forming a desired perforation pattern.

4. A method of making cellular core panel with internal septum for installation in the high velocity air flow region of an engine nacelle, and other applications requiring sound absorption and increased air frame strength, the steps consisting of:
  placing a destructible mold on a base;
  positioning a film of septum material on top of the mold, the film of the septum having a desired thickness;
  positioning a cellular core above the film of the septum material and pressing the core through the septum material and into the material of the destructible mold until the septum material is at a precise position internally in the core;
  forming a permanent septum in each cell of the core by heat curing the septum material; and
  removing the mold from the cellular core by heating and melting the mold therefrom.

5. The method as described in claim 4 further including the step of warming the mold to a temperature so that the mold can be easily cut by a single layer of the cellular core prior to positioning the septum material on top of the mold.

* * * * *